UNITED STATES PATENT OFFICE.

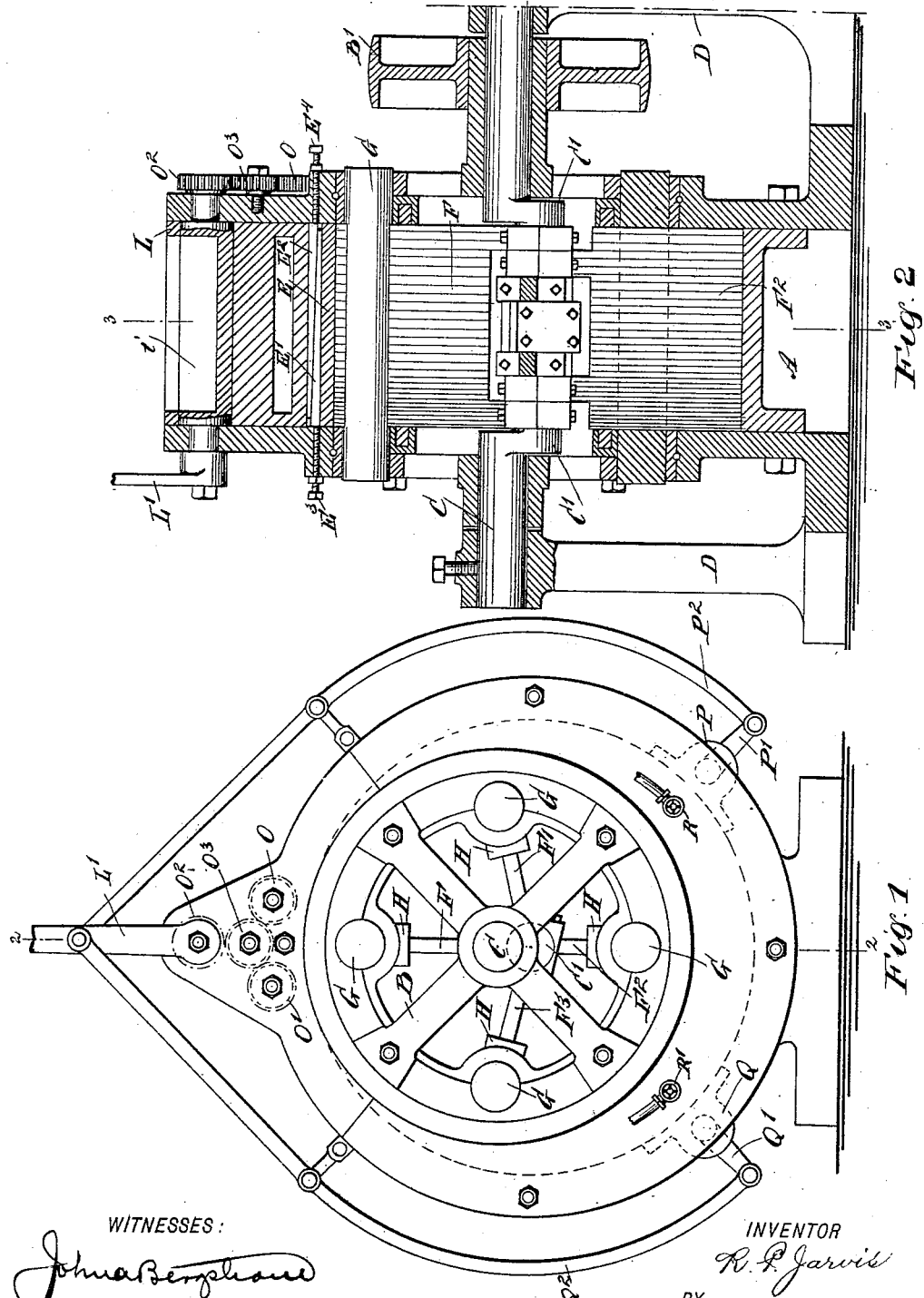

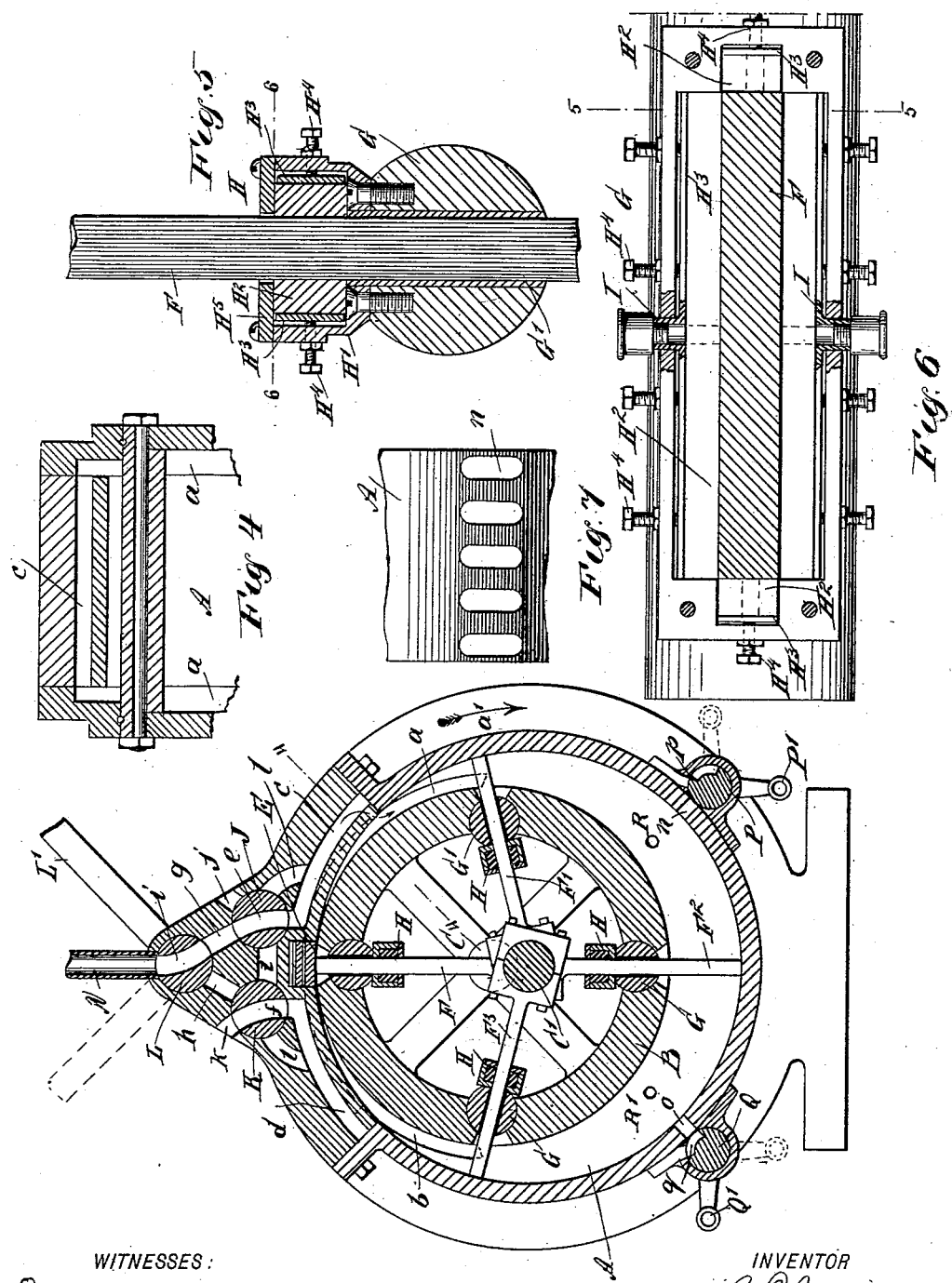

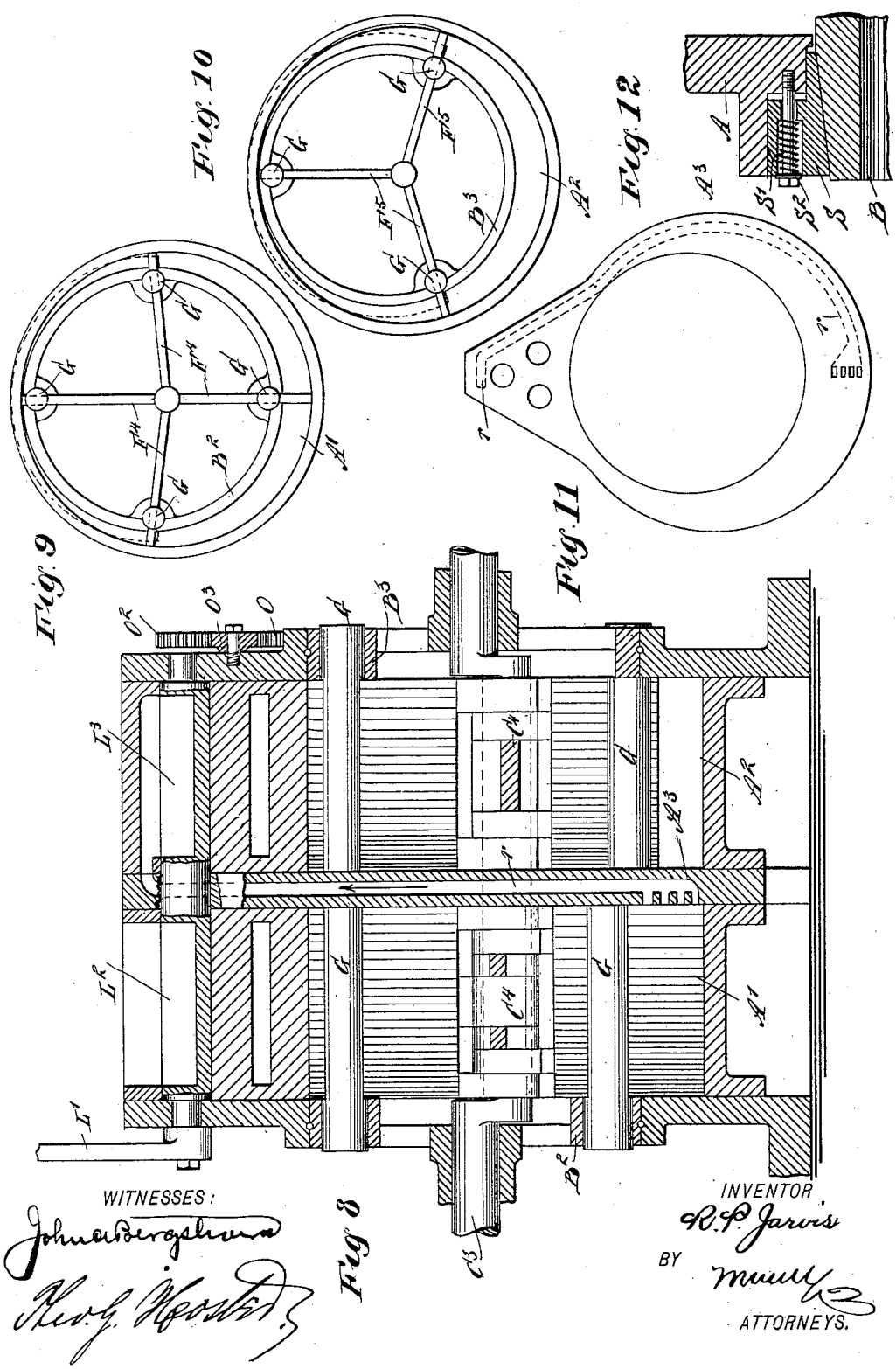

REUBEN PALMER JARVIS, OF SMITH CENTRE, KANSAS.

ROTARY ENGINE.

SPECIFICATION forming part of Letters Patent No. 602,703, dated April 19, 1898.

Application filed May 6, 1897. Serial No. 635,385. (No model.)

*To all whom it may concern:*

Be it known that I, REUBEN PALMER JARVIS, of Smith Centre, in the county of Smith and State of Kansas, have invented a new and Improved Rotary Engine, of which the following is a full, clear, and exact description.

The object of the invention is to provide a new and improved rotary engine which is simple and durable in construction, very effective in operation, and arranged to utilize the motive agent expansively and to the fullest advantage, with the friction of the working parts reduced to a minimum.

The invention consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figure 1 is an end elevation of the improvement. Fig. 2 is a sectional side elevation of the same on the line 2 2 of Fig. 1. Fig. 3 is a cross-section of the same on the line 3 3 of Fig. 2. Fig. 4 is a sectional side elevation of part of the improvement on the line 4 4 of Fig. 3. Fig. 5 is an enlarged sectional elevation of one of the bearings for an abutment, the section being on the line 5 5 of Fig. 6. Fig. 6 is a sectional plan view of the same on the line 6 6 of Fig. 5. Fig. 7 is an enlarged face view of part of one of the exhaust-valves. Fig. 8 is a sectional side elevation of the improvement as arranged for a compound engine. Fig. 9 is a diagrammatic view of the high-pressure cylinder, its piston, and piston-heads. Fig. 10 is a similar view of the low-pressure cylinder, piston, and piston-heads. Fig. 11 is a reduced face view of the partition between the high and low pressure cylinders shown in Fig. 8, and Fig. 12 is a sectional side elevation of the packing for the piston in the cylinder.

The improved rotary engine is provided with a cylinder A, in which is mounted eccentrically a piston B, mounted to rotate loosely on a shaft C, secured in suitable bearings on standards D, the hub of the piston being provided with a pulley $B'$ for transmitting the rotary motion of the piston to other machinery. The peripheral surface of the piston B is in contact with the inner surface of the cylinder A at a packing E, held in a recess in the said cylinder and adjusted toward the peripheral surface of the piston B by two wedges $E'$ and $E^2$, held to slide one on the other and adjusted at their base ends by set-screws $E^3$ $E^4$, respectively, screwing in the sides of the cylinder, as illustrated in Fig. 2. The piston B is provided with a number of piston-heads F, $F'$, $F^2$, and $F^3$, as shown in the drawings, all pivotally connected at their inner ends with a crank-arm $C'$, formed or secured on the shaft C.

The piston-heads F, $F'$, $F^2$, and $F^3$ extend through slots in the rim of the piston, and each of the heads is fitted to slide in a trunnion G, mounted to rock in suitable bearings attached to or formed on the piston B, as plainly indicated in Fig. 1. Each trunnion G is provided with a lining $G'$ for the head to slide in, and on each trunnion, and preferably at the inner face thereof, is secured a packing H for making a steam-tight joint between the abutment and its trunnion to prevent steam from leaking from the cylinder past the abutment into the open piston B.

The packing H (shown in detail in Figs. 5 and 6) is provided with a casing $H'$, fastened by screws or other means to the trunnions G, and in the said casing are held the packing-plates $H^2$, fitted upon the side faces of the piston-head, the said packing-plates being made of a suitable material and engaged at their outer faces by bars $H^3$, pressed up against the packing by set-screws $H^4$, screwing in the casing $H'$.

By the arrangement described the operator is enabled at any time to screw up the set-screws $H^4$ to move the packing-plates $H^2$ in firm contact with the piston-heads, so as to prevent leakage. A cap $H^5$ is secured to the casing to exclude dust or other impurities from the packing. The packing H is also provided with oil-cups I for lubricating the piston-heads.

In the heads of the cylinder A, on opposite sides of the packing E, are formed the ports $a$ and $b$, connected with the ports $c$ and $d$, registering with ports $e$ and $f$, respectively, formed in the valves J and K, mounted to turn in suitable bearings in the upper end of the cylinder A, the said ports being adapted to register with the steam-inlet ports $g$ and $h$, respectively, either of which can be connected with a port $i$, formed in the inlet-valve L, connected with the steam-inlet pipe N, leading from a boiler or other suitable source of motive-agent supply.

The ports $e$ and $f$ in the valves J K are also adapted to register with the exhaust-ports $j$ $k$, respectively, leading to the outside or into exhaust-pipes for carrying off the exhaust-steam. The shafts of the valves J, K, and L carry the gear-wheels O, O', and $O^2$, respectively, all in mesh with a central gear-wheel $O^3$, mounted to rotate on a stud secured to the outside of the cylinder, as indicated in Figs. 1 and 2. On the other end of the shaft for the valve L is secured a handle L', under the control of the operator, to turn the said valve to move its port $i$ in register with either of the inlet-ports $g$ or $h$ or into an intermediate position to disconnect the port $i$ from both ports $g$ and $h$. Now when the valve L is turned the gear-wheel $O^2$ rotates the central gear-wheel $O^3$, which in turn rotates the other gear-wheels O and O', so that the valves J and K are rotated simultaneously with the valve L.

Now when the valves are in the position shown in Fig. 3 the port $i$ connects the steam-inlet pipe N with the port $g$ while the port $h$ is closed, and the said port $g$ is connected by the port $e$ with the ports $c$ $a$, so that the motive agent passes into the cylinder at the right-hand side of the piston B to act on the outer ends of the piston-heads to rotate the piston in the direction of the arrow $a'$. The exhaust-steam on the other side of the piston B can pass by the ports $b$ $d$ through ports $f$ $k$ to the outside.

Now when it is desired to reverse the engine the operator turns the handle L' over into a left-hand position, as shown in dotted lines in Fig. 3, whereby the port $i$ is disconnected from the ports $g$ and $e$ and connected with the port $h$, which also registers with the port $f$, opening into the port $d$. The other valve J has its port $e$ in register with the port $c$ and the exhaust-port $j$. Now the motive agent passes from the pipe N through ports $i$, $h$, $f$, $d$, and $b$ into the cylinder at the left-hand side of the piston B to act on the piston-heads to rotate the piston in the inverse direction of the arrow $a'$. The exhaust-steam on the right-hand side of the piston B can pass through the ports $a$, $c$, $e$, and $j$ to the outside. When the handle L' is moved into a vertical position, the valve L is then turned into such a position as to cut off the steam from both ports $g$ and $h$ and the valves J and K are turned in such a position that their ports $e$ and $f$ register with a port $l$, connecting the two ports $c$ and $d$ with each other, so that any steam contained in one side of the cylinder can pass to the other side, so as to prevent a vacuum being formed in the side of the cylinder. When it is again desired to start the engine, the operator moves the handle L' either to the right or to the left for rotating the piston in the direction of the arrow $a'$ or in the inverse direction thereof, as above explained.

In order to utilize the steam expansively, I extend the ports $a$ and $b$ a considerable distance within the cylinder A, as plainly indicated in Fig. 3, so that live steam can pass into two compartments to act simultaneously on two piston-heads for a while until the preceding piston-head passes the end of the corresponding port to cut off the steam from the preceding working chamber to allow the steam to operate expansively therein until the first piston-head passes the exhaust-port $o$ or $n$, formed in the lower end of the cylinder and adapted to register with ports $q$ and $p$, respectively, in the exhaust-valves Q and P, respectively, mounted to turn in suitable bearings attached to the cylinder. The valves P and Q are provided with arms P' and Q', respectively, connected by links $P^2$ and $Q^2$ with the handle or lever L', so that the said exhaust-valves are actuated simultaneously with the inlet and reversing valves, as above explained.

When the valves J K L are in the position shown in Fig. 3, the valve P then closes the port $n$, while the other valve, Q, has its port $q$ in register with the exhaust-port $o$ to allow steam to escape at this point from the cylinder—that is, the steam between the piston-heads $F^2$ and $F^3$ can pass to the outer air by way of the ports $o$ $q$, and when the head $F^2$ has passed the port $o$ the exhaust-steam between the heads F' and $F^2$ is exhausted through the said registering ports after the steam has operated expansively against the head $F^2$, as above mentioned.

When live steam passes into the cylinder at the port $b$, the valve Q closes the port $o$, and the valve O has its port $p$ in register with the exhaust-port $n$ to allow steam to escape from the cylinder at this point.

In the arrangement shown in Figs. 8, 9, 10, and 11 the engine is provided with a high-pressure cylinder A' and a low-pressure cylinder $A^2$, separated from each other by a head or partition $A^3$, having a port $r$ connecting the lower end of the high-pressure cylinder A' with the inlet-valve $L^3$ for the low-pressure cylinder $A^2$. The valve $L^3$ moves with the inlet-valve $L^2$, corresponding to the valve L of the engine previously described.

In the cylinder A' is mounted to turn the piston $B^2$, having, say, four sliding piston-heads $F^4$, constructed and operating as above described in reference to the piston B; but the low-pressure cylinder $A^2$ has a piston $B^3$ with but three piston-heads $F^5$ to allow more room for the expanded steam to work against the said piston-heads in the cylinder $A^2$. The valve mechanism and other parts for the cylinder A' and $A^2$ are exactly the same as above described in reference to the single-cylinder engine.

Into each of the cylinders A A' open live-steam pipes R R' directly opposite the ports $n$ and $o$, respectively, and each of these pipes is provided with a cock under the control of the engineer, and each pipe is connected with the live-steam-supply pipe N. Now in starting the engine steam can be admitted into the cylinder directly by opening the cock in the corresponding pipe to rotate the piston in the desired direction. When the engine is started, the cock is again closed.

In order to insure a steam-tight joint between the piston B and the cylinder A, I prefer to use instead of an ordinary packing-ring the wedge-shaped packing-ring S; fitted over the beveled edge of the piston, as plainly shown in Fig. 12. The ring S is fitted to slide in a recess in the cylinder and is pressed inwardly by springs S', held on bolts $S^2$, secured to the cylinder and extending through the ring.

Having thus fully described my invention, I claim as new and desire to secure by Letters Patent—

1. In a rotary engine, the combination with a cylinder, of a fixed shaft having a crank-arm in the cylinder, a piston mounted eccentrically in the cylinder and to turn loosely on the said shaft, said piston having its rim slotted, rocking bearings carried by the piston, a packing on the inner face of the bearing, said packing comprising a casing secured to the bearing and adjustable packing-plates in the casing, piston-heads sliding in the bearings and packings and having their inner ends pivotally connected with the crank-arm of the said shaft, and means for operating the piston, substantially as described.

2. In a rotary engine, the combination with a cylinder, provided with the ports $a$, $b$, $c$, $d$, $g$, $h$, $j$ and $k$ and a rotary piston having sliding heads, of the valves J, K, L mounted to turn and having ports $e$, $f$, $i$, respectively, extending through them, the valve L being connected with the steam-inlet, and means for operating the said valves in unison, substantially as described.

3. In a rotary engine, the combination with a cylinder provided with the ports $a$, $b$, $c\,d$, $g$, $h$, $j\,k$ and $l$, the port $l$ connecting the ports $c\,d$, and a rotary piston having sliding piston-heads, of the valves J K L mounted to turn and having the ports $e\,f\,i$ respectively extending through them, the valve L being connected with the steam-inlet N, and gearing between the said valves for turning them in unison, substantially as described.

4. In a rotary engine, the combination of a cylinder having in its upper part the ports $a\,b\,c\,d\,g\,h\,j\,k$ and $l$, and the ports $n\,o$ in its lower portion, a rotary piston having sliding piston-heads, the valves J K L mounted to turn and having the ports $e\,f\,i$ respectively, the valve L being connected with the steam-inlet, the valves P Q having ports $p\,q$ adapted to register with the ports $n\,o$ respectively, and means for operating all of the said valves in unison, substantially as described.

5. A rotary engine, provided with a piston-head, a trunnion in which the piston-head is fitted to slide, and a packing for the said piston-head and comprising a casing secured to the said trunnion, packing-plates engaging the faces of the piston-head, bars engaging the said packing-plates, and a set-screw held in the casing and engaging the said bars to adjust the latter and the packing-plates, substantially as shown and described.

REUBEN PALMER JARVIS.

Witnesses:
CLARE E. HOLMES,
H. C. SMITH.